United States Patent [19]

Takemoto et al.

[11] 3,948,209

[45] Apr. 6, 1976

[54] INDICATOR APPARATUS

[75] Inventors: Shungo Takemoto, Ibaragi; Tetuo Tanabe, Nagaokakyo, both of Japan

[73] Assignee: Matsushita Electric Industrial Co., Ltd., Osaka, Japan

[22] Filed: July 26, 1974

[21] Appl. No.: 492,143

[30] Foreign Application Priority Data
Aug. 4, 1973 Japan................................ 48-87910
Aug. 4, 1973 Japan................................ 48-87911

[52] U.S. Cl................................ 116/124.4; 340/380
[51] Int. Cl.².......................................... H03J 1/04
[58] Field of Search....... 116/124.4, 124.3, 124.2 R, 116/124.1; 350/96 B; 340/380; 334/88, 86, 87

[56] References Cited
UNITED STATES PATENTS

| | | | |
|---|---|---|---|
| 2,151,275 | 3/1939 | Lesti | 116/124.2 R |
| 2,898,465 | 8/1959 | Carlson | 334/88 |
| 3,836,911 | 9/1974 | Gibson | 116/124.4 |
| 3,857,361 | 12/1974 | Gibson | 116/124.4 |

*Primary Examiner*—S. Clement Swisher
*Assistant Examiner*—Denis E. Corr
*Attorney, Agent, or Firm*—Stevens, Davis, Miller & Mosher

[57] ABSTRACT

There is provided, in accordance with this invention, an indicator apparatus comprising a sign board which is free to rotate and has a plurality of light transparent portions each being formed in a sign shape, a display board which has display perforations, a plurality of optical fibers each of which is disposed so as to be adjacent at one end to said display perforation and at the other end to said light transparent portion of said sign board, and a driving means which makes said sign board rotate.

8 Claims, 6 Drawing Figures

3,948,209

INDICATOR APPARATUS

This invention relates to an indicator apparatus which is capable of displaying signs such as letters, numerals or the like.

Heretofore, many kinds of indicator apparatus have been proposed. Indicator apparatus of various instruments now commonly used have a constitution in which a light transparent disc plate is printed with numerals so that leteers may be displayed by a light source from the rear side of the plate. In particular, the indicator apparatus of television receiver tuning instrument usually is of this kind. There are some kinds of indicator apparatus which include combined lamps or numeral displaying tubes; however, these apparatus are disadvantageous in that they have a complicated constitution and also are expensive.

As object of this invention is to provide an indicator apparatus which has eliminated the above-mentioned disadvantages and has a novel constitution.

Another object of this invention is to provide an indicator apparatus which comprises a plurality of optical fibers as a displaying member so as to clearly display a plurality of signs such as numerals, letters or the like by a simple constitution and, further, is compact, light and easy in assembly and mounting.

These and other objects, features and advantages of the present invention will be apparent from the following description taken in conjunction with the accompanying drawings, in which.

Figure 1:
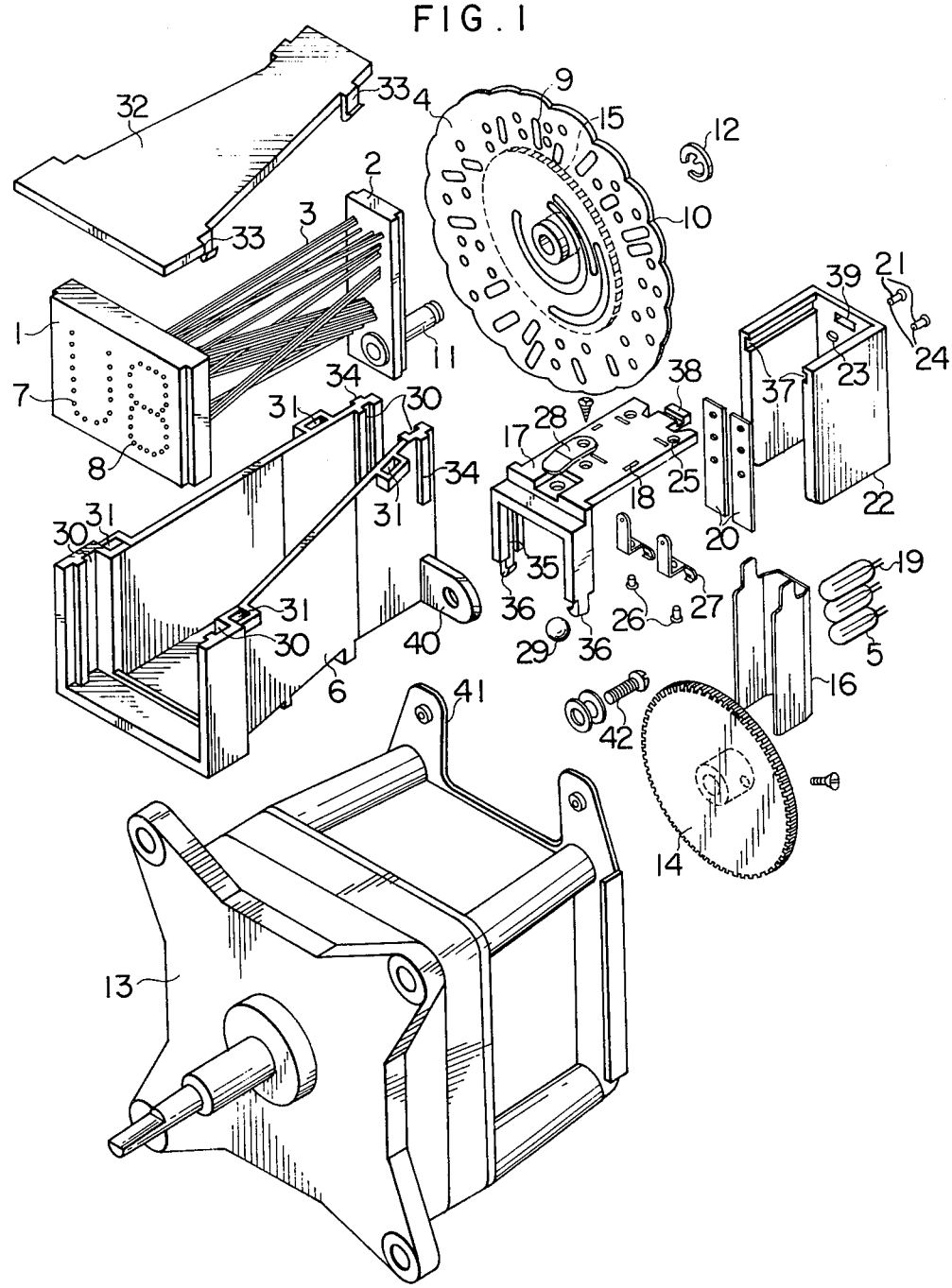
FIG. 1 is a perspective view, in a disassembled form, of an embodiment according to this invention.
Figure 2:
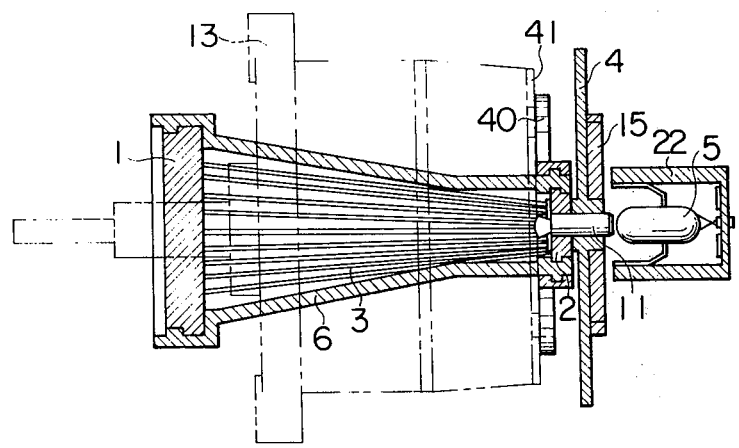
FIG. 2 is a plan sectional view of the embodiment as shown in FIG. 1.
Figure 3:
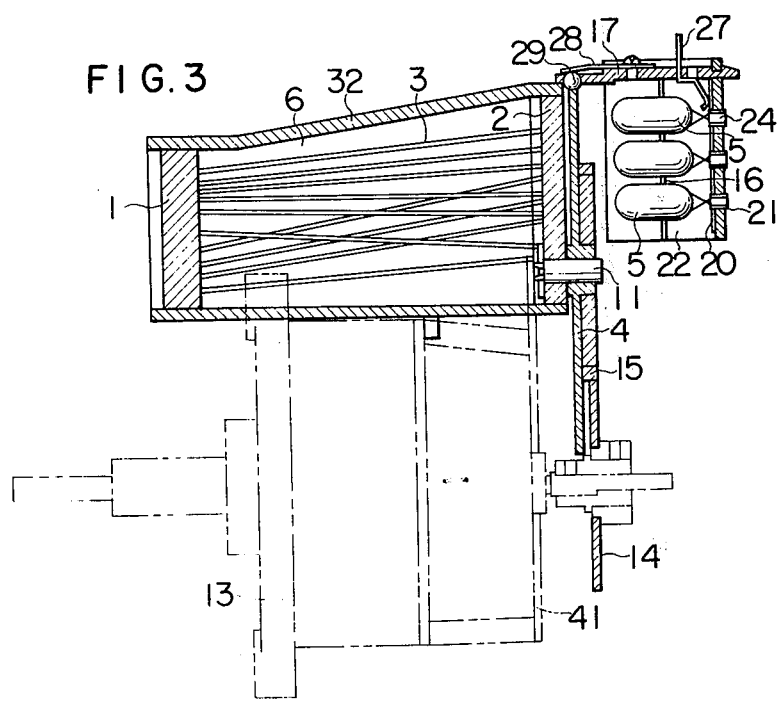
FIG. 3 is a side sectional view of the embodiment as shown in FIG. 1.
Figure 4:
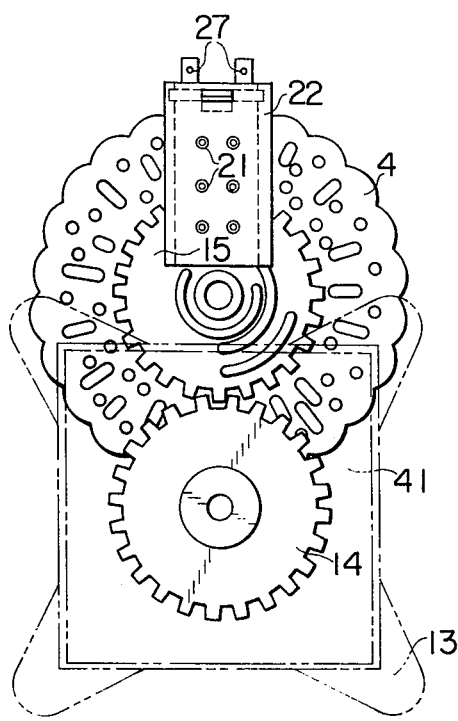
FIG. 4 is a back view of the embodiment as shown in FIG. 1.
Figure 5:
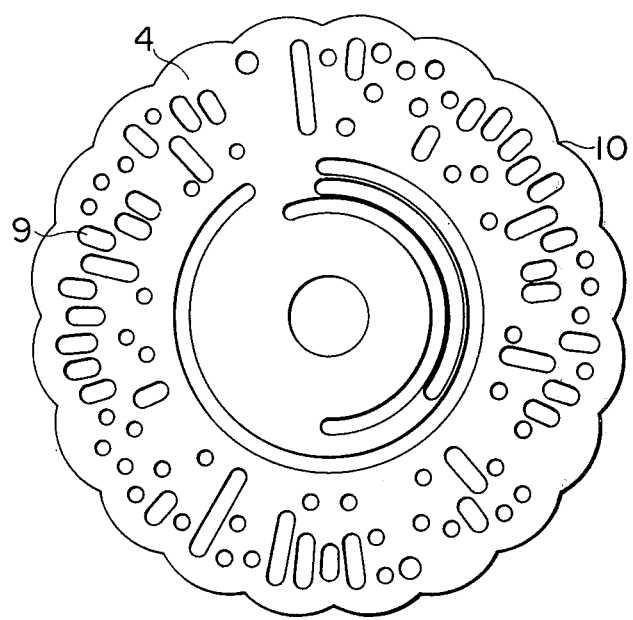
FIG. 5 is a plan view of a sign board employed in the embodiment as shown in FIG. 1.

An indicator apparatus according to this invention consists of the display part comprising a display board 1, a block board 2 and a plurality of optical fibers 3, a letter forming part comprising a sign board 4 for shaping letters and light sources 5 disposed at the back of the sign board 4, and a main body case 6. The display part is, in FIG. 1, displaying an U-shaped letter 7 and a ੪ shaped letter 8 on the display body 1 through display perforations and the plurality of optical fibers 3 each having one end disposed adjacent to one of the display perforations. The U-shaped letter 7 is constituted in such a manner that the relevant optical fibers are divided into three groups; i.e., left side, down side and right side, so as to be inserted into the display board 1. Similarly, the ੪ shaped letter 8 is constituted in such a manner that the relevant optical fibers are divided into seven groups each corresponding to a straight and non-joining section of ੪ so as to be inserted into the display board 1. On the other hand, the block board 2 has perforations which accept the optical fibers constituting the letters 7 and 8, respectively. The sign board 4 for shaping letters comprises a plane portion and a peripheral portion, the former has a plurality of circular or elliptic signs 9 printed by making the portions corresponding to the signs 9 transparent to light while the latter has a plurality of concave and convex portions 10. The sign board 4 is rotatably mounted on a shaft 11 fixed to the block board 2 and is retained by an E-shaped snap ring 12. The sign board 4 and the light source 5 cause only desirable groups of the optical fibers 3 to be illuminated and only desirable letters to be formed. Further, the sign board 4 is mounted on the shaft which is directly fixed to the block board 2 so that the optical fibers 3 and the signs 9 of the sign board 4 may little deviate from each other. The sign board 4 is adapted to be rotated by a gear 14 being engaged with a gear 15, the gear 14 being mounted on the rotation axis of a driving means 13 of an electronic tuning instrument and the gear 15 being mounted integrally with the sign board 4 at the rear end. The light source 5 at the back of the sign board 4 includes several lamps which are loosely held by a reflector 16. The reflector 16 is fixed to a source holding body 17 at holes 18 and the legs 19 of the lamps are fixed in the holes 24 of hollow rivets 21 by soldering, after two electrode plates 20 are mounted on a protecting frame 22 by calking hollow rivets 21 through eyelets 23. The electrodes 20 are respectively connected with terminals 27 which are fixed to the source holding body 17 by calking hollow rivets 26 through holes 25 so that electric power may be supplied through the connecting terminals 27.

The source holding body 17 is provided with a leaf spring 28 and a ball 29 so that the sign board 4 may be precisely stopped. This is achieved in cooperation with the concave and convex portions 10 of the sign board 4. The main body case 6 is open in three directions and is provided with a pair of vertical grooves 30 and engaging grooves 31. The vertical grooves 30 are formed at both ends on the inside of the case 6 and are adapted to removably receive the display board 1 and the block board 2 of the display part. The engaging grooves 31 are formed on the outer periphery of the upper opening portion of the case 6 and are removably fitted with pawls 33 of a lid 32. The source holding body 17 is mounted on the main body case 6 by removably fitting vertical grooves 35 of the source holding body 17 on projections 34 provided on the outer periphery on the block board side of the main body case 6, and so, the source holding body 17 presses the outer wall of the main body case 6 through pawls 36. The source holding body 17 is mounted on the protecting frame 22 by fittedly inserting the plane portion of the source holding body 17 into a pair of grooves 37 provided on the upper periphery of the inside of the protecting frame 22 and further by fitting elastic pawls 38 through a hole 39.

The main body case 6 is mounted on metal members 41 in such a manner that a pair of fixing members 40 projected from the block board side lower portion of the outer wall of the case 6 is fixed by screws 42 to metal members 41 of the driving means 13, and the convex and concave portions 10 of the sign board 4 and the ball 29 of the source holding body 17 are pressed against each other so that the sign board 4 can be reliably and intermittently stopped.

When the indicator apparatus of the constitution as described above is mounted on the driving means 13 of an electronic tuning apparatus and a switching means (not shown) for switching channels is turned, the gear 14 of the driving means 13 which is fixed coaxially with the switching means and the gear 15 of the sign board 4 are engaged with each other so that the sign board 4 can be rotated and stopped as desired and, as a result, the optical fibers 3 corresponding to any desired letter are illuminated at the block board 2 from the source 5 through the sign board 4 causing the desired letter to be displayed on the display board 1.

As described above, the indicator apparatus according to this invention has a plurality of optical fibers which are employed as a display body, the sign board which is disposed at the back of the optical fibers and is adapted to be rotated by a rotation driving means commonly used with other apparatus, and the light source which is disposed at the back of the sign board. Therefore, when the indicator apparatus is used in the tuning apparatus of a television receiver, it is possible by rotating the switching means only once that any desirable numerals or signs serving to indicate UHF and VHF channels are displayed simply and clearly on the display board. Further, since the display part is housed detachably in the main body case and the main body case has also the source holder and protecting frame detachably mounted therein, the whole apparatus is small and light, that is, very compact, convenient for assembly and disassembly and ready for mounting on some apparatus. Consequently, the efficiency in manufacturing is enhanced and the work for exchanging the light source and other parts can be readily performed.

The sign board 4 may be made of a light opaque material. In this case, the signs 9 may be formed by perforating the portions corresponding to the signs 9.

Figure 6:
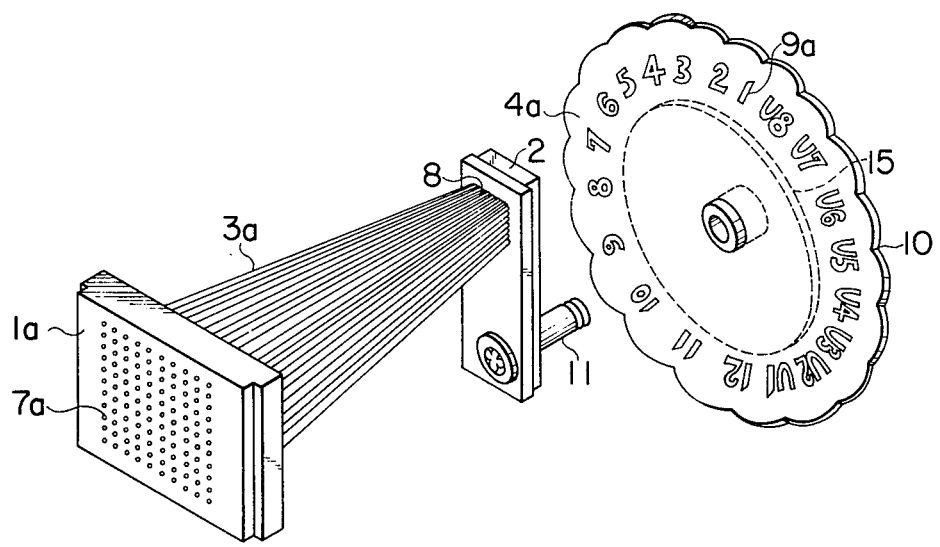
FIG. 6 is a perspective view of the essential parts of another embodiment according to this invention.

Another embodiment of this invention is shown in FIG. 6. A display board 1a has a plurality of display perforations 7a regularly formed therein, a plurality of optical fibers 3a are, respectively, inserted into the above-mentioned display perforations 7a at their ends and are arranged in a similarly regular way to be fixed to a block board 2 at their opposite ends so that light from behind the block board 2 may be incident to the optical fibers 3a. A sign board 4a is made to be light transparent only at portions corresponding to signs 9a which have the various shapes to be displayed. Such constitution allows signs which are enlarged in size and the same in shape as the signs 9a on the sign board 4a to be displayed on the display board 1a.

In addition, the shape of the sign board 4a is not limited to that of the above-mentioned embodiments but may be cylindrical, for example, instead of circular. In this case, the same effect can be obtained by disposing the light source inside the cylindrical sign board.

What we claim is:
1. An indicating apparatus comprising:
   a display case;
   a display board defining a plurality of display perforations therein, said display board being arranged in the front end portion of said display case;
   a block board defining a plurality of input perforations therein, said block board being positioned parallel to said display board in the rear end portion of said display case;
   a plurality of optical fibers extending between said display board and said block board, each of said fibers being so arranged that input and output ends of said fiber are respectively opposed to one of said input perforations and one of said display perforations;
   a disk-like sign board rotatably provided behind said block board, said sign board selectively masking a group of said input perforations of said block board and displaying a character or characters for indicating a VHF or UHF broadcasting station;
   a lighting source in the rear of said sign board for applying a light beam thereof to said optical fibers;
   a first gear wheel fixed on said sign board;
   a driving means for selecting both VHF and UHF channels having a rotatable shaft projecting from the front wall of said driving means; and
   a second gear wheel positioned behind the rear wall of said driving means, said second gear wheel being rotatable with said rotatable shaft;
   said display board being positioned parallel to and near the front wall of said driving means, said sign board being arranged parallel to and near the rear wall of said driving means, and said first gear wheel engaging with said second gear wheel.

2. An indicator apparatus according to claim 1, wherein a plurality of said display perforations are divided into several groups one of which constitutes one segment of a character, and transparent sign portions for forming a character or characters which are circumferentially provided in said sign board and are arranged in a matrix so as to illuminate some of said segments.

3. An indicator apparatus according to claim 1, wherein said rotatable sign board has a series of arcuate projections formed on the periphery thereof, each pair of adjacent projections defining a recess therebetween, and a ball which resiliently abuts against the periphery of said sign board, said ball causing said sign board to click-stop as said sign board rotates.

4. An indicator apparatus according to claim 3, wherein a second case is provided to enclose said lighting source positioned behind said sign board, the top wall of said second case defining a hole encasing said ball and being fixedly provided with a spring which presses downward the top of said ball so that a portion of said ball which projects from said hole abuts the recess of said sign board.

5. An indicator apparatus according to claim 1, wherein said display case is provided on the top of said driving means, and first and second grooves are provided in the front and rear end portions of said case, said display board and said block board being respectively inserted into said first and second grooves to be fixed therein.

6. An indicator apparatus according to claim 5, wherein a shaft for rotating said sign board is provided on the lower portion of said block board.

7. An indicator apparatus according to claim 1, wherein a plurality of said display perforations are regularly arranged in said display board, and a plurality of said input perforations are also regularly arranged in said block board, said display perforations and said input perforations are regularly connected with said optical fibers therebetween, and transparent sign portions each of which is in the shape of a displayed character itself is provided in sign board.

8. An indicator apparatus comprising:
   a display case;
   a display board defining a plurality of display perforations therein, said display board being arranged in the front portion of said display case;
   a block board defining a plurality of input performations therein, said block board being positioned parallel to said display board in the rear end portion of said display case;

a plurality of optical fibers extending between said display board and said block board, each of said fibers being so arranged that said input and output end of the fibers are respectively opposed to one of said input perforations and one of said output perforations, the area defined on said block board by the plurality of said optical fibers being less than that on said display board;

a disk-like sign board rotatably provided behind said block board, said sign board selectively masking a group of said input perforations of said block board and displaying a character or characters for indicating a VHF and UHF broadcasting station;

a shaft for rotating said sign board mounted on said block board at a position displaced from the center of said block board so that said one group of transparent sign portions of said sign board which form character or characters are opposed to the input ends of said optical fibers;

a lighting source behind said sign board for applying a light beam therefrom to said fibers;

a first gear wheel fixed to said sign board;

a driving means for selecting both VHF and UHF channels having a rotatable shaft projecting from the front wall of said driving means; and a second gear wheel positioned behind the rear wall of said driving means rotatable with said rotatable shaft;

said display board being positioned parallel to and near the front wall of said driving means, said sign board being arranged parallel to and near the rear wall of said driving means, and said first gear wheel engaging said second gear wheel.

* * * * *